(12) United States Patent
Gaiser et al.

(10) Patent No.: US 7,290,965 B2
(45) Date of Patent: Nov. 6, 2007

(54) TOOL, METHOD, AND APPARATUS FOR REMOVING BURRS FROM BORES

(75) Inventors: Gilbert Gaiser, Sigmaringen (DE); Harald Hebisch, Sigmaringen (DE)

(73) Assignee: Jorg Guhring, Albstadt (DE)

( * ) Notice: Subject to any disclaimer, the term of this patent is extended or adjusted under 35 U.S.C. 154(b) by 211 days.

(21) Appl. No.: 10/440,455

(22) Filed: May 16, 2003

(65) Prior Publication Data
US 2005/0095072 A1    May 5, 2005

Related U.S. Application Data

(63) Continuation-in-part of application No. 10/246,530, filed on Sep. 19, 2002, now abandoned.

(30) Foreign Application Priority Data

| May 17, 2002 | (DE) | 102 22 155 |
| Oct. 18, 2002 | (DE) | 102 48 777 |
| May 14, 2003 | (DE) | 103 21 670 |

(51) Int. Cl.
   *B23C 3/00*    (2006.01)

(52) U.S. Cl. .......... 409/132; 408/57; 408/226; 408/230; 407/53

(58) Field of Classification Search ........ 408/57, 408/59, 226, 156, 230; 407/53, 54, 11; 409/138, 409/139, 140, 131, 132, 136
See application file for complete search history.

(56) References Cited

U.S. PATENT DOCUMENTS 960,526 A    6/1910    Erlandsen
(Continued)

FOREIGN PATENT DOCUMENTS

AU    253909    5/1963
(Continued)

OTHER PUBLICATIONS

Abstract for Russian 20111482, published Apr. 30, 1994.*
(Continued)

*Primary Examiner*—Daniel W. Howell
(74) *Attorney, Agent, or Firm*—Boyle Frederickson S.C.

(57) ABSTRACT

A preferably rotationally driven tool is specified for the deburring of openings, such as for example bores that open laterally into an essentially cylindrical recess. The tool has a cutting head that is seated on a shaft and that has at least one cutting edge that extends, at least in segments, in the axial direction. So that the deburring can be carried out reliably and with the lowest possible expense, a radial force-producing device is integrated into the tool, for example in the form of at least one internally situated flow medium channel, from which at least one branch channel goes out that opens in the area of the cutting head or in the vicinity thereof, preferably at a peripheral distance to the at least one cutting edge, in the external peripheral surface thereof. Because the diameter of the cutting head is selected such that it can be introduced into the recess with radial play, the radial force produced either upon rotation of the tool or through the feeding in of a flow medium under pressure has the result that the cutting head is elastically deflected radially, through which the inner surface of the recess is gently processed, and thereby enabling reliable execution of the deburring process.

44 Claims, 9 Drawing Sheets

U.S. PATENT DOCUMENTS

| | | | |
|---|---|---|---|
| 1,760,354 A | 5/1930 | Gartin | |
| 2,222,313 A * | 11/1940 | Heald | 408/95 |
| 2,224,386 A * | 12/1940 | Guild | 408/199 |
| 2,273,228 A * | 2/1942 | Smith | 408/147 |
| 2,438,741 A * | 3/1948 | Coulson | 408/154 |
| 2,441,158 A * | 5/1948 | Krasnow | 408/147 |
| 2,775,147 A * | 12/1956 | Schneebeli et al. | 82/1.5 |
| 2,820,376 A * | 1/1958 | Jannenga et al. | 82/1.2 |
| 2,905,028 A * | 9/1959 | Massari | 82/1.2 |
| 3,007,356 A * | 11/1961 | Jones | 408/147 |
| 3,241,403 A * | 3/1966 | Eades et al. | 82/1.4 |
| 3,293,727 A | 12/1966 | Simms | |
| 3,365,987 A * | 1/1968 | Heller et al. | 408/72 R |
| 3,379,077 A | 4/1968 | Gustafson | 408/156 |
| 3,902,386 A * | 9/1975 | Dressler et al. | 82/1.4 |
| 4,224,846 A * | 9/1980 | Eysel et al. | 82/158 |
| 4,563,837 A | 1/1986 | Ono | |
| 4,594,033 A * | 6/1986 | Peetz et al. | 408/156 |
| 4,705,435 A | 11/1987 | Christoffel | |
| 4,756,648 A * | 7/1988 | Cusack | 408/156 |
| 4,775,268 A * | 10/1988 | Michalon | 408/156 |
| 4,933,868 A * | 6/1990 | McMurtry | 700/160 |
| 5,161,924 A | 11/1992 | Hekman | |
| 5,238,335 A | 8/1993 | Nomura | |
| 5,304,019 A * | 4/1994 | Klee et al. | 408/156 |
| 5,314,545 A | 5/1994 | Folts et al. | |
| 5,368,420 A * | 11/1994 | Gerk et al. | 408/156 |
| 5,378,091 A | 1/1995 | Nakamura | |
| 5,595,462 A * | 1/1997 | Hensley | 409/132 |
| 5,971,988 A | 10/1999 | Reccius et al. | |
| 6,179,532 B1 | 1/2001 | Oldham | |
| 6,270,295 B1 * | 8/2001 | Hyatt et al. | 408/1 R |
| 6,394,466 B1 | 5/2002 | Matsumoto et al. | |
| 6,497,540 B1 | 12/2002 | Shikata et al. | |
| 2003/0215295 A1 * | 11/2003 | Gaiser et al. | 408/59 |

FOREIGN PATENT DOCUMENTS

| | | | |
|---|---|---|---|
| DE | 1167302 | | 4/1964 |
| DE | 1477523 A | * | 4/1969 |
| DE | 2129768 | | 1/1972 |
| DE | 3321208 | | 12/1983 |
| DE | 3314718 | | 10/1984 |
| DE | 3521450 | | 1/1986 |
| DE | 3507923 | | 9/1986 |
| DE | 4015412 C1 | | 6/1991 |
| DE | 4128028 A1 | | 2/1993 |
| DE | 19613772 A1 | | 10/1996 |
| DE | 101 18 596 A1 | | 10/2002 |
| DE | 10321670 | | 12/2004 |
| EP | 1362659 | | 11/2003 |
| GB | 546973 | | 8/1942 |
| GB | 2112679 A | * | 7/1983 |
| JP | 60221205 A | * | 11/1985 |
| JP | 04087707 A | * | 3/1992 |
| JP | 08 318419 A | | 12/1996 |
| RU | 1814987 A1 | * | 5/1993 |
| SU | 263380 | * | 11/1970 ................. 408/147 |
| SU | 1242311 A | * | 7/1986 |
| SU | 1310118 A1 | * | 5/1987 |
| SU | 1404187 A1 | * | 6/1988 |
| SU | 1364400 A1 | * | 11/1988 |

OTHER PUBLICATIONS

Abstract for Russian 2063856, published Jul. 20, 1996.*
Abstract for German 1004010372, published Sep. 22, 2005.*

* cited by examiner

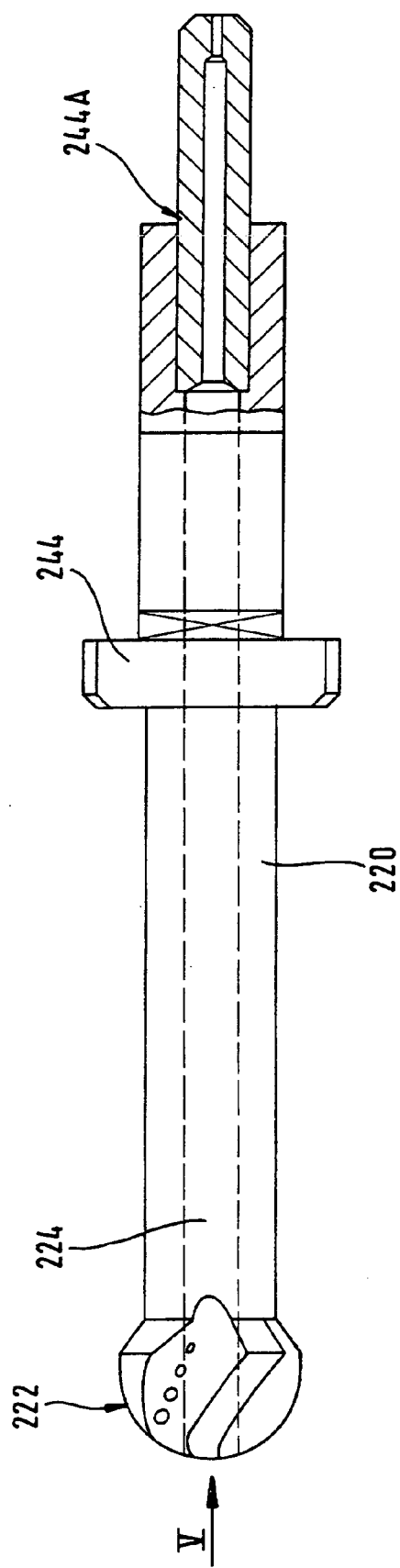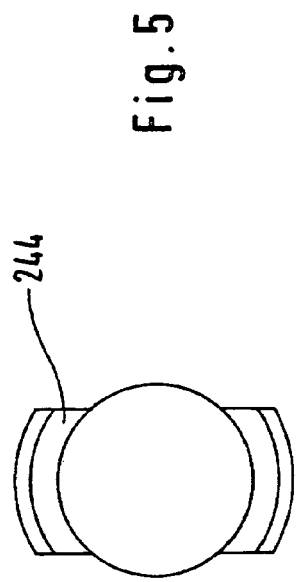
Fig. 4
Fig. 5

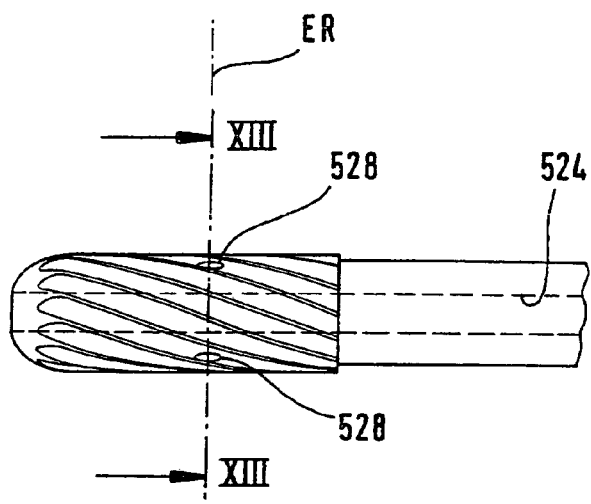
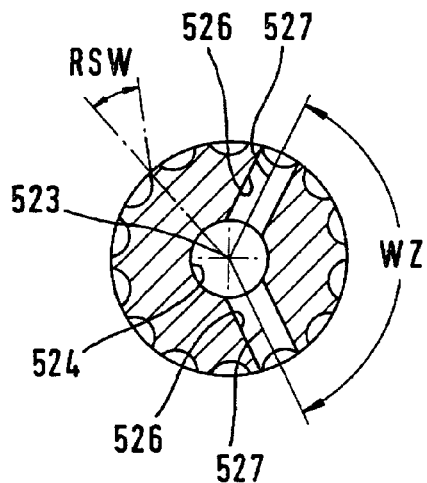
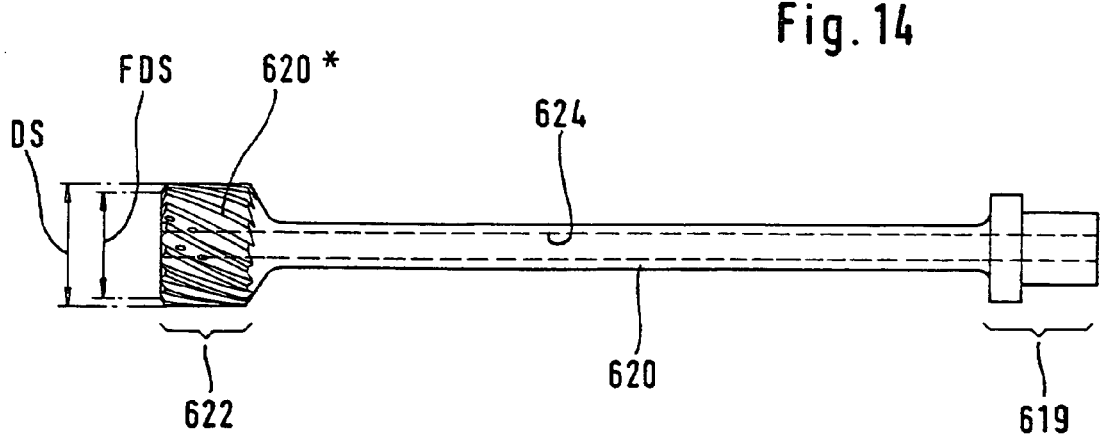

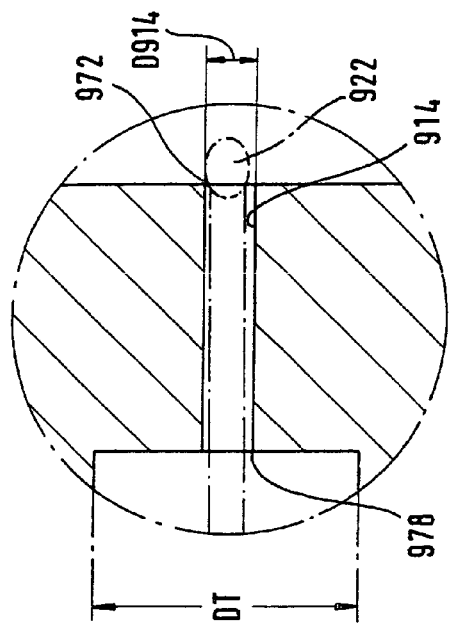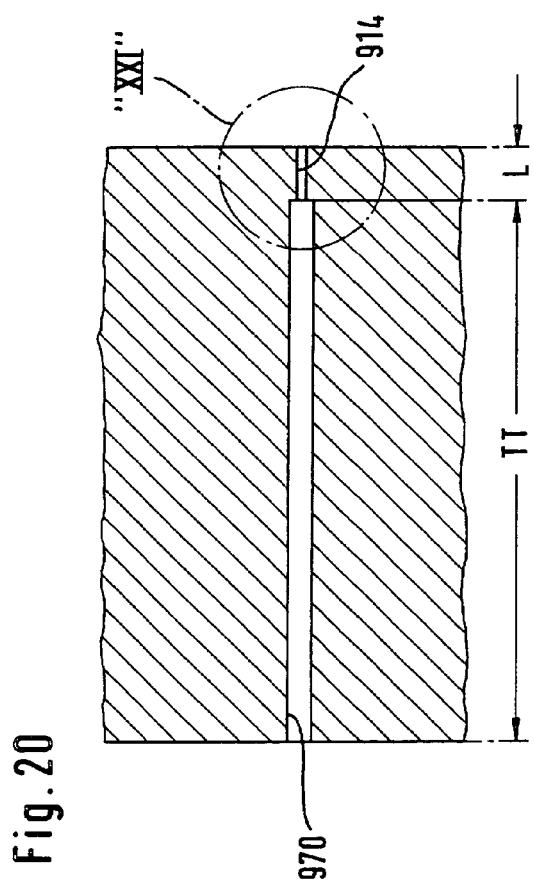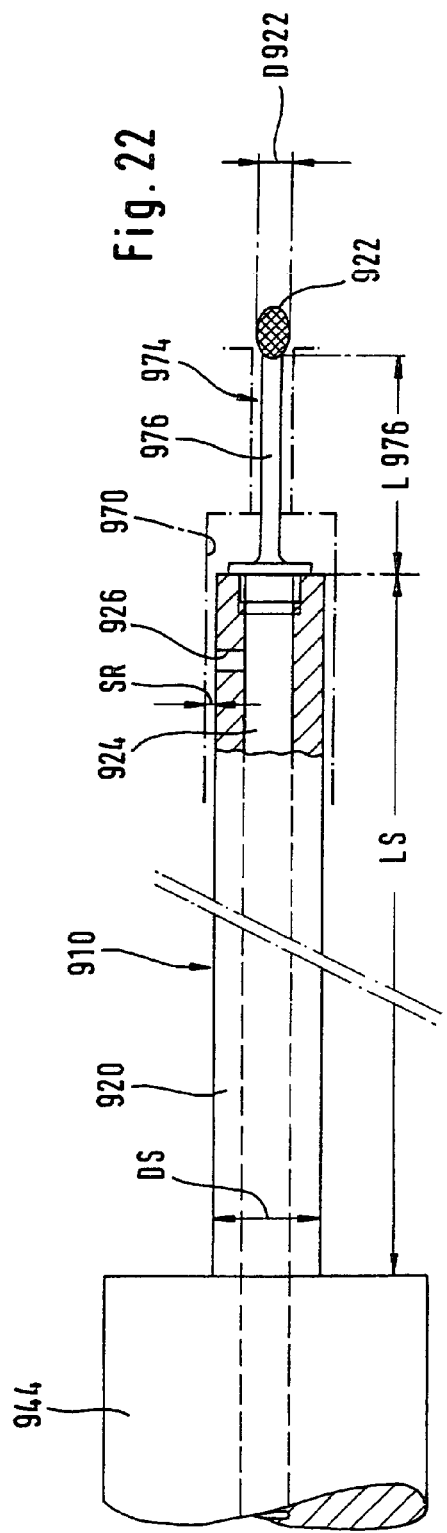

TOOL, METHOD, AND APPARATUS FOR REMOVING BURRS FROM BORES

CROSS-REFERENCE TO RELATED APPLICATION

This application is a continuation in part of U.S. patent application Ser. No. 10/246,530, filed on Sep. 19, 2002 now abandoned, which is expressly incorporated by reference herein.

BACKGROUND OF THE INVENTION

1. Field of the Invention

The present invention relates to a preferably rotationally driven tool for deburring bores, such as for example bores that open laterally into a recess or opening that is for example cylindrical, according to the preamble of claim 1. In addition, the present invention relates to an apparatus and to a method for deburring bores of this sort, in which a tool according to the present invention is intended to be used.

2. Description of the Related Art

The deburring of bores that open laterally into a recess that is for example cylindrical presents a great problem. Bores of this sort, for example in the area of automotive technology (in the case of radial bores that open into a central axial bore of the camshaft or of the crankshaft) and the area of mobile hydraulics, are inaccessible if for example a valve piston accommodated in a central bore is to be driven via control connections in the form of radial channels. Because as a rule these radial channels must be manufactured in one bore processing step, even if the bore tool has a special construction it cannot be reliably excluded that a burr or a residual chip sliver/splinter remains in the area in which the radial channel opens into the central bore opening.

Apart from the fact that this chip influences the flow relationships and thus has an adverse effect on the adjustment and functioning of the corresponding hydraulic control unit, there arises the particular problem that such a chip, if it is not removed before the initial operation of the system, is torn away after a certain period of time and causes serious damage in the system.

Thus, over the course of the development of control technology, which continues to become more and more sensitive, attempts have always been made, at increasing expense, to remove these residual chips as completely as possible from the radial channel opening. Here, specially constructed tools have come into use with which the cutting head situated on the shaft can be brought into contact with the chip to be removed with the greatest possible positional precision.

SUMMARY OF THE PRESENT INVENTION

However, the great precision required for this has the consequence that the manufacturing process becomes significantly more expensive.

The present invention is therefore based on the object of providing a tool and an apparatus, as well as a method, with which the deburring process can be carried out in an essentially more economical fashion, while remaining reliable and error-free.

This object is achieved with respect to the tool by the claimed features.

According to the present invention, the tool has integrated into it a device for producing radial force, with which it is possible to radially deflect the cutting head of a very simply constructed tool that is introduced with a relatively low degree of precision into the recess or bore, so that a cutting head that executes a relative rotational movement in relation to the workpiece and is driven for example rotationally executes a kind of "circular" or "wobbling" shaving or cutting movement along the inner surface of the recess or bore, and thus of the opening, e.g., of the radial channel.

Here the cutting edge of the tool moves on a cycloid in relation to the recess in the workpiece. It has turned out that in this way it is possible to remove the burr or the residual chips that may be present in a manner that is protective but is also reproducible and reliable, without running the risk that a further formation of residual chips may take place at a different location.

The radial force acting on the cutting head for the preferably controlled radial deflection thereof can be produced in various ways. And, advantageous variants are the subject matter of the subclaims.

In a particularly efficient construction, a flow medium under pressure that is already present anyway in standard processing centers, such as for example a cooling and lubricating agent used in machining, is used to deflect the cutting head radially, so that it fulfills the deburring function.

With this deflection, both the impulse forces caused by the dynamic pressure of the flow medium in the region of the cutting head, or in the immediate vicinity thereof, and those caused by the diversion of the stream of the flow medium, play a role, so that the effective radial force remains easily controllable.

Because the point of engagement of the tool is constantly flushed with flow medium under pressure, the chip-removing effect is further increased. Via the pressure of the flow medium, and/or the geometry of the tool shaft, the radial deflection of the tool shaft can be controlled within broad limits, so that the radial play of the cutting head in the recess can be predetermined comparatively coarsely. This makes the tool less expensive. However, the controlling of the drive apparatus in which the tool is accommodated can also be greatly simplified in this way, because the tool can be positioned relatively coarsely to the axis of the recess. As a result, the tool can also be mounted or clamped/chucked in machines that operate relatively imprecisely. It positions itself with its shaving movement against the inner circumference of the recess. It has been determined that the principle of operation of the present invention is applicable for all currently used materials, i.e., from steel and gray-cast iron to plastics.

In principle, a single branch channel is sufficient to form, in the area between its opening and the inner wall of the recess, a pressure force that deflects the tool radially far enough for the cutting edge to come into effective engagement. Here it has further turned out that it is even possible to adjust the pressure of the flow medium to the diameter of the branch channel in such a way that from the branch channel there is emitted a stream of flow medium that has the function of a cutting jet, as is known from what is referred to as "water cutting"; i.e., with which a machining operation can be carried out. In other words, the jet exiting from the opening can be used for deburring independently of the deflecting function for the tool shaft, even in situations in which lubricant pressures in the range of 30 bar and higher are applied, as is standard today.

A particularly effective kind of processing results from the development using a multiplicity of branch channels which permits the execution of a more effective and faster processing. In addition, this modification permits the attachment of a plurality of cutting edges on the cutting head, so that the required processing time can be further reduced.

If a plurality of branch channels are provided whose openings are staggered in the axial direction, the above-discussed "cutting jet effect" can be used over an enlarged axial length, which contributes further to the reduction of the processing time.

It has turned out that particularly advantageous results can be achieved using particular dimensions for the branch channel as recited in claim 5, i.e., if the diameter of the branch channels is in the range from about 0.1 to 5 mm.

The radial flexibility of the tool can easily be controlled via the length of the shaft; here there is the advantageous side effect that a long shaft has the result that the tool can be used more universally, i.e., for the deburring of bores that open relatively far in the interior of the recess. The range of use is preferably for shaft lengths in the range from 5 to 1000 mm.

If a plurality of internally situated flow medium channels are provided, there result more possibilities for the situation of the openings on the outer peripheral surface of the cutting head.

The openings can be situated in the area of a cutting edge, so that the space between the opening and the inner wall of the recess is as small as possible. However, it has been shown that the openings can also be situated in the area of a groove or slot bottom between two adjacent cutting edges, if the flow medium pressure is selected high enough to produce a sufficiently large dynamic pressure force.

In principle, the branch channel can be oriented arbitrarily, and can also be curved, e.g. in the shape of a helix. Preferably, the at least one branch channel is formed rectilinearly, and can be formed either by a bore or by an eroded recess. In the latter case, there remains a greater degree of flexibility in the design of the channel cross-section.

If the angle of the branch channel to the axis of the tool is selected in the range from 5° to 175°, preferably from 25° and 155°, particularly preferably between 40° and 50°, the flow losses remain controllable.

If the at least one cutting edge is placed at an angle to an axial plane of the tool, it is possible to carry out a targeted influence on the cutting conditions during the deburring, thus improving the operating precision.

Good results have been achieved with a radial play between the cutting head and the inner wall of the recess in the range between 0.1 and 0.5 mm, this play being coupled to the magnitude of the operating pressure of the flow medium. Values for the play of up to 5 mm can also be controlled.

In a very effective alternative for the formation of the radial-force-producing device, an imbalance of the tool, preferably the imbalance in the area or in the vicinity of the cutting head, is used for the controlled radial deflection of the cutting head. Via the rotational speed, the absolute dimension of the radial deflection can easily be controlled, which makes it possible to introduce the cutting head into the recess or bore for example at a relatively low rotational speed, and subsequently to increase the rotational speed high enough that the desired deburring movement of the at least one tool cutting edge results. In this specific embodiment, the design of the cutting head or of the cutting edges can be executed in the same way as in the earlier described variants.

A further possibility for influencing the radial deflection is the optimization of the geometry of the tool shaft. With the development of tapering the shaft, the required radial flexibility of the shaft can be further improved.

In another aspect of the preferred embodiment, the introduction of the tool is further simplified. If a kind of notch or chamfer is made on both sides of the cutting head, the tool can also be used for the deburring of the interior exit of a bore into which the tool is introduced. Here the wobbling movement of the cutting head in turn gradually shaves off the bore chip, with the rounding of the cutting head facing the shaft.

There are practically no limitations on the choice of the material of the tool. The tool can be manufactured, either as a whole or else at least in the area of the cutting head, from a high-tensile material such as e.g. wear-resistant steel, high-speed steel (HSS, HSSE, HSSEBM), hard metal or sintered carbide or tungsten carbide, ceramic, or cermet; here suitable coatings can also be used.

The tool can also be adapted to be an easily manipulable unit that can be used in standard tool holding fixtures.

In another aspect, the interface to the flow medium connection is created using efficient means.

In an especially simple and economical variant is the fastening and fixing element simultaneously forms the element for feeding in the flow medium. This element preferably has the shape of a simple elongated hollow cylinder that can even be glued to the shaft of the tool. Provided with a suitable corrosion-resistant coating, this element can be manufactured from ordinary steel, because the fixing in the tool holding fixture can take place in that the cylindrical element is pressed against a shoulder surface in the tool holding fixture by the flow medium pressure acting on the rear side.

The tool can be fashioned as a milling tool, a boring tool, in particular a deep-hole boring tool, a straight-fluted boring tool, or a spiral boring tool, or as a reamer.

If the cutting angle, or, in the embodiment as a milling or frictional tool, the tool back clearance, is positive, e.g., in a size range from about 0° to 10°, preferably maintained at about 5° or less, the cutting edge can have the chip-removing or machining effect already at relatively low radial pressure forces, so that the flow medium pressure can be kept smaller.

According to another feature, the at least one cutting edge operates with an action that is closer to shaving. The cutting edges take on a profile closer to that of a file, with the result that processing should take place with a flow medium pressure that is higher than the other embodiments.

If a plurality of openings are provided, they are preferably situated in a peripheral area that is limited by a central angle up to 180°, preferably up to 120°. In this case, it is advantageous to distribute the openings uniformly over this angular range. If, for example, two openings or two rows of openings are present, the angular spacing of the openings, or of the rows of openings, is about 120°. If there are three openings, the angular distance is reduced to about 60°, if there are four openings the angular distance is reduced to about 40°, and if there are five openings the angular distance is reduced to about 30°.

If the at least one cutting edge runs essentially in the shape of a helix, an edge design results that is particularly advantageous for the removal of the burr. In this case, it is advantageous, if there is a plurality of openings, to arrange these as well on an essentially helical line, or, if a tapering of the cutting head in the axial direction is taken into account, a spiral-shaped line.

The development of the tool is advantageous in particular if the shaft of the tool is of an extremely thin construction, e.g. for the case in which the deburring process is to be carried out in the area of a bore having a diameter of less than 1 mm, and is connected to a relatively deep bore likewise having a small diameter, for example up to approximately 4 mm. The choice of material ensures that the tool remains sufficiently stable even with such a thin shaft construction, in order to center the cutting head exactly even after repeated use. It thereby becomes possible to control the processing precision in a particularly effective manner. The cutting head itself can then be manufactured from other materials, and can for example be fastened to the shaft of the tool in detachable fashion.

In an advantageous construction of the device for deburring bores that open laterally into an essentially cylindrical recess, the rotational drive device can be formed by a simple turning lathe or boring machine [or drill, or a robot. In both cases, machines that operate relatively imprecisely are adequate.

It has turned out that the flow medium itself can be formed by a gaseous medium, such as for example air, in order to produce the required forces for deflecting the tool shaft. Of course, all standard cooling agents and lubricants can be used, including minimal-quantity lubricants.

Preferably, the device operates with a flow medium pressure in a range from 3 to 3000 bar.

If the tool has a fastening and fixing element as recited in claim 28, it is advantageous for this element to be accommodated in the tool holding fixture in the manner of a bayonet socketor quarter-turn fasterner.

A particular aspect of the present invention is that the (relatively high) flow medium pressure is used to fix the tool in the tool holding fixture axially and in the peripheral direction. This is because it has turned out that the cutting forces during deburring can easily be absorbed by the frictional force that arises when the fastening and fixing element is pressed against a retaining shoulder by the flow medium pressure. This is further facilitated in that the fastening and fixing element can be given a greater diameter than the cutting head.

With the development of a tool holding fixture as set forth in the claimsaim 42, there results an effective rapid clamping device for the tool, having elegant constructive elements.

The essential elements of the method according to the present invention for deburring bores, for example bores that open laterally into an essentially cylindrical recess, as set forth in the claims. The basic principle is that the flow medium pressure of the tool introduced into the recess is used to deflect the cutting head radially, and in this way to cause the at least one cutting edge to come into engagement with the chip to be removed.

Further advantageous constructions are the subject matter of the remaining subclaims.

BRIEF DESCRIPTION OF THE DRAWINGS

In the following, a plurality of exemplary embodiments of the present invention are explained in more detail on the basis of schematic drawings.

FIG. 4 shows a schematic side view of a further specific embodiment of the tool according to the present invention;

FIG. 5 shows the view "V" in FIG. 4;

FIG. 12 shows, in a somewhat enlarged representation, the cutting head of the tool according to FIG. 11;

FIG. 13 shows, in an enlarged view, the section according to XIII-XIII in FIG. 12;

FIG. 14 shows, in a somewhat enlarged scale, the schematic side view of a further specific embodiment of the deburring tool;

FIG. 20 shows the schematic view of a bore that is to be deburred at particularly inaccessible locations, using a specially constructed tool according to the present invention;

FIG. 21 shows the representation of the detail "XXI" in FIG. 20; and

FIG. 22 shows, in a scale that is somewhat reduced in comparison with FIG. 21, the view of a tool with which the processing task according to FIGS. 20, 21 can be performed.

DETAILED DESCRIPTION OF THE PREFERRED EMBODIMENTS

Figure 1:
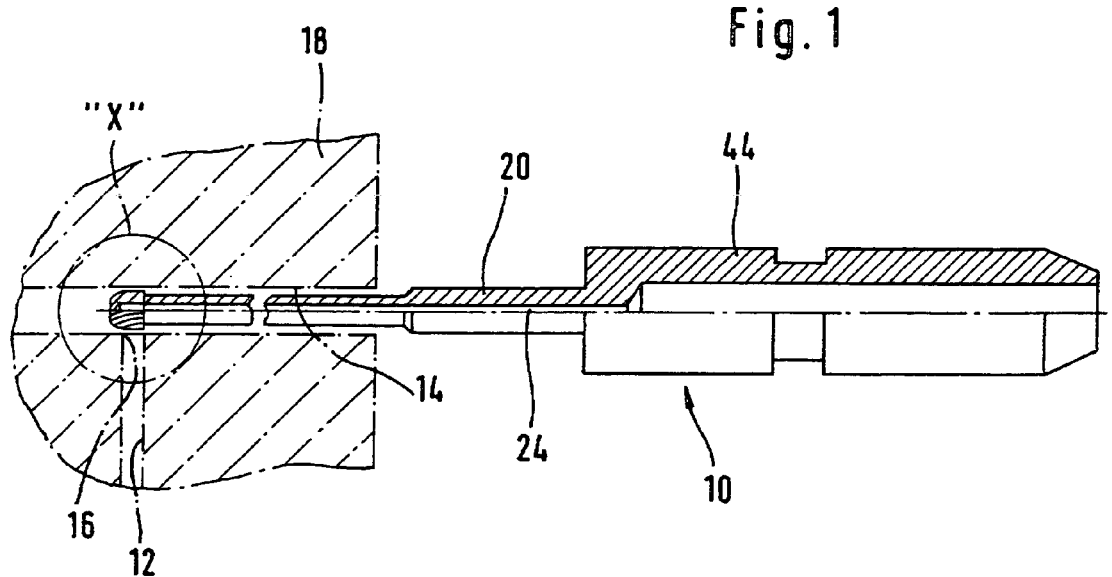
FIG. 1 shows a schematic side view of a tool according to the present invention, according to a first specific embodiment.

In FIG. 1, reference character 10 designates a rotationally driven, preferably rotationally symmetrical post-processing tool in its construction as a deburring tool, with which it is possible to debur, at their radially inner ends 16, bores 12 that open laterally into an essentially cylindrical recess 14 in a workpiece 18, in a particularly economical manner that is as reliable as possible. However, here it should also already be emphasized that the tool can also be static, and that the workpiece can be placed into rotational motion, instead of or in addition to the tool. Moreover, the tool can also be used for the deburring of the openings of recess 14.

The tool is for example formed as a milling tool, a boring tool, in particular a deep-hole boring tool, a straight-fluted boring tool or a spiral boring tool, or a reamer. It is decisive that it has at least one cutting edge 20* that can execute a machining.

Figure 2:
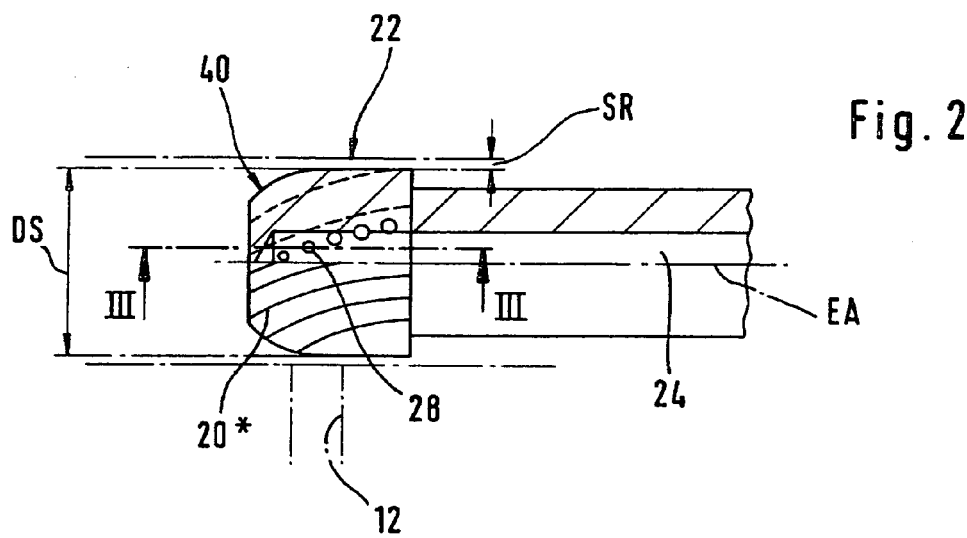
FIG. 2 shows the detail "II" in FIG. 1.
Figure 3:
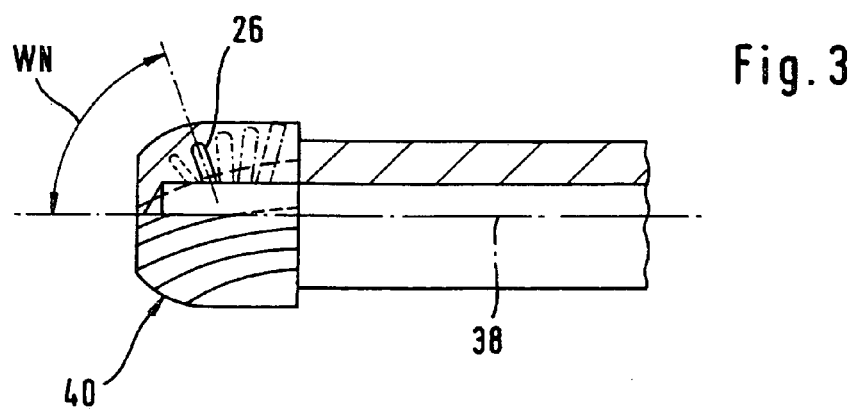
FIG. 3 shows a schematic section III-III in FIG. 2.

In the tool, on a shaft 20 there is a cutting head 22 that has a multiplicity of cutting edges 20*, at least sections of which extend in the axial direction, as can be seen in FIGS. 2 and 3.

The tool has an interior flow medium channel 24, from which a plurality of branch channels 26 go out or originate in the area of the cutting head. These branch channels are situated in such a way that they open with openings 28 in the area of cutting head 22, into the external peripheral surface thereof. As can be seen from FIG. 2, the cutting edges are distributed over the entire periphery, so that openings 28 stand at a peripheral distance to at least one cutting edge 20*, e.g. the diametrally opposite cutting edge. From FIGS. 1 to 3, it can further be seen that diameter DS of cutting head 22 is selected such that it can be introduced into recess 14 with radial play SR. The radial play is preferably up to a few ⅟₁₀ mm, and is preferably in the range between 0.1 and 5 mm.

Figure 8:
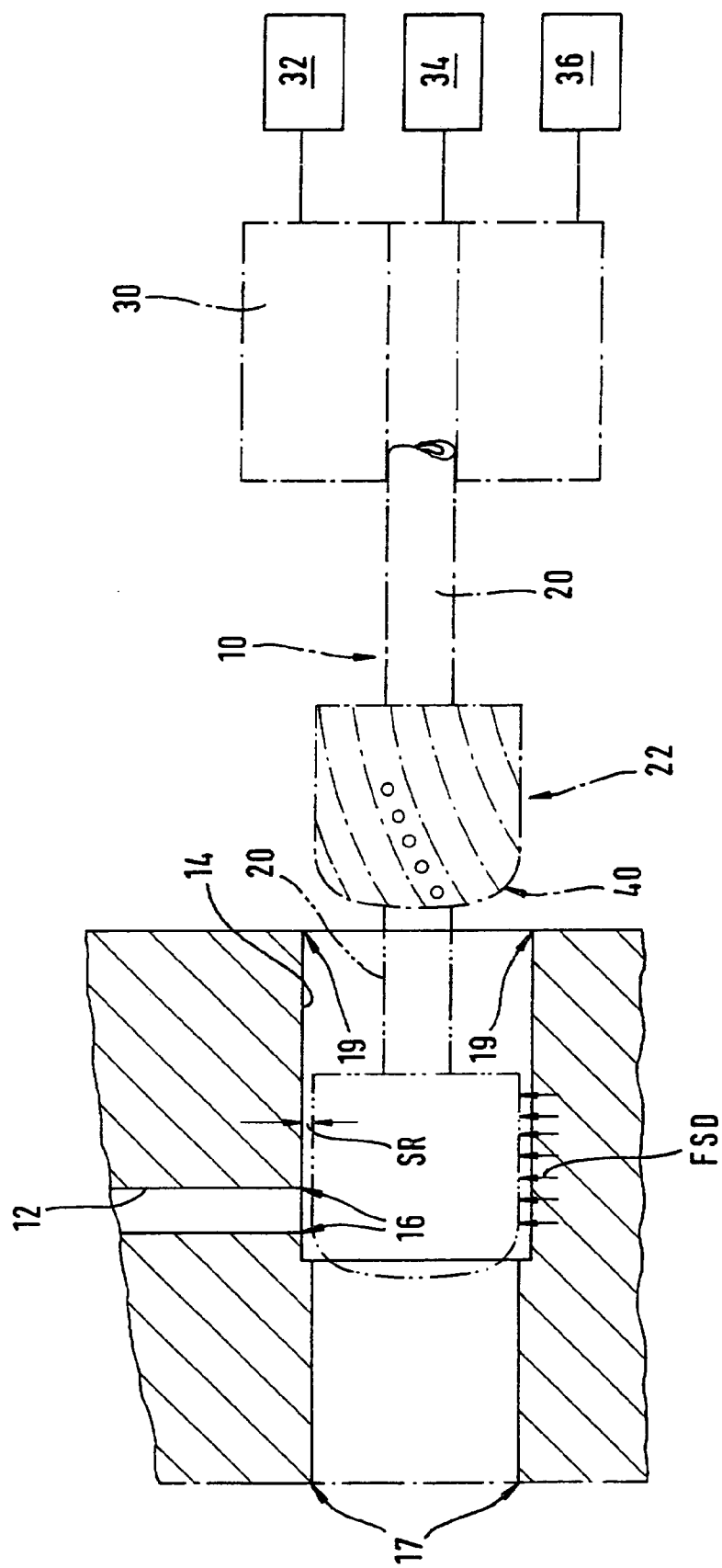
FIG. 8 shows a schematic view of the positions of the tool according to the present invention before and during the processing engagement.

With this design of the tool, the following operating principle can be realized, with the effects described in the following on the basis of FIG. 8.

For the realization of the rotational drive, tool 10 is accommodated in a tool holding fixture 30 so as to be secure against rotation and shifting. A rotational drive 32, an advance drive 34, and a flow medium pressure source 36 are allocated to the tool holding fixture. The advance and/or the rotational drive can also be provided for workpiece 18. For workpiece 18, an additional rotational drive and/or advance can also be provided.

If radial bore 12 is to be deburred in the radially inner opening area, tool 10 is first brought to recess 14 (position shown in dash-dotted lines). Due to the radial play SR, the positioning can take place relatively imprecisely, permitting the use of relatively imprecise machines.

Subsequently, the rotational drive and the advance are actuated, so that the tool is moved into the recess (or executes a corresponding kinematically reversed movement) far enough that opening location 16 is reached. Flow medium, for example water or another tool cooling and lubricating agent, or else also a gaseous flow medium, under a relatively high pressure of 3 to 3000 bar, is fed into interior flow medium channel 24; this takes place at the latest when frontmost cutting edge 20* reaches this location (position shown with dash-double-dotted line). Thus, in cooperation with the inner peripheral wall of recess 14, a correspondingly large dynamic pressure builds up in the area of openings 28; this is indicated by the small arrows in FIG. 8. In addition, due to the impulse caused by the diversion of the flow medium, a radial deflection force acts on cutting head 22.

The multiplicity of openings 28 are distributed over the periphery in non-uniform fashion, such that the sum of the dynamic pressure forces produced in the area of openings 28 between cutting head 22 and the inner wall of recess 14 can deflect shaft 20 in the radial direction, so that the cutting edge situated opposite the resulting dynamic pressure force touches the burr to be processed at location 16, and cuts or shaves along this burr. In other words, at this moment the tool executes a circular movement that is superposed on the rotational movement and that has a radius of radial play SR.

In addition, each time an opening 28 reaches radial bore 12 and passes over it, an energy-rich cutting jet builds up that leads to an additional machining processing of the critical location 16. In this way, the deburring process is carried out very effectively.

As can be seen from FIGS. 1 to 3, branch channels 26 are situated such that their openings 28 are staggered in the axial direction. However, this is not absolutely necessary.

Branch channels 28 have for example a diameter or an inside clearance in the range from 0.1 to 5 mm.

From the above description, it is clear that the dynamic pressure forces at the indicated pressure values of the flow medium are large enough to deflect flexible shaft 20 sufficiently far. The elastic deformation can be controlled over the length of the shaft, which can be in the range from 5 to 1000 mm. The Figure shows that shaft 20 is tapered in relation to diameter DS of cutting head 22.

Openings 28 can be situated in the area of a cutting edge 20* and/or in the area of a groove bottom between two adjacent cutting edges.

From FIG. 3, it can be seen that branch channels 26 are formed in rectilinear fashion. These channels can be formed by a bore or by an eroded recess.

Angle WN by which branch channel 26 is inclined to axis 38 of tool 10 is preferably in the range from 5° to 175°, preferably from 25° to 155°, and particularly preferably between 40° and 50°. However, other angles can also be used.

Although in the depicted specific embodiment cutting edges 20* are placed at a particular angle to an axial plane EA of tool 10, this is not absolutely required.

As is further shown in FIGS. 1 to 3 and 8, cutting head 22 has a notch 40 that is preferably formed by a chamfer or a rounding, for example having a spherical form.

The tool can also be manufactured from wear-resistant steel, high-speed steel (HSS, HSSE, HSSEBM), hard metal, ceramic, or cermet, and can be provided with a suitable standard coating.

With the above-described tool, it is possible to debur not only locations 16, but also locations 17 and 19, situated in the vicinity of bore 14.

In the following, it is described how the tool is fixed in tool holding fixture 30 so as to be secure against rotation and shifting. For this purpose, reference is first made to FIGS. 6 and 7, in which a variant of the tool according to FIGS. 1 to 3 is indicated. A fastening and fixing element, designated 44 in FIGS. 1 to 3, which is formed in one piece with shaft 20, is formed as a glued-on cylindrical sleeve 144 in the specific embodiment according to FIG. 6. In other respects, tool 110 corresponds to tool 10. Those components of the specific embodiment according to FIG. 6 that correspond to the components of the tool according to FIG. 1 to 3 are provided with corresponding reference characters to which a "1" has been prefixed.

Sleeve 144 is made of ordinary steel, preferably provided with a coating that protects against corrosion. In addition to the gluing, a stud screw (not shown) can be used that connects sleeve 144 with shaft 120 in positively locking fashion.

146 designates a chamfer via which the fluid-tight connection to the flow medium source is effected.

Figure 6:
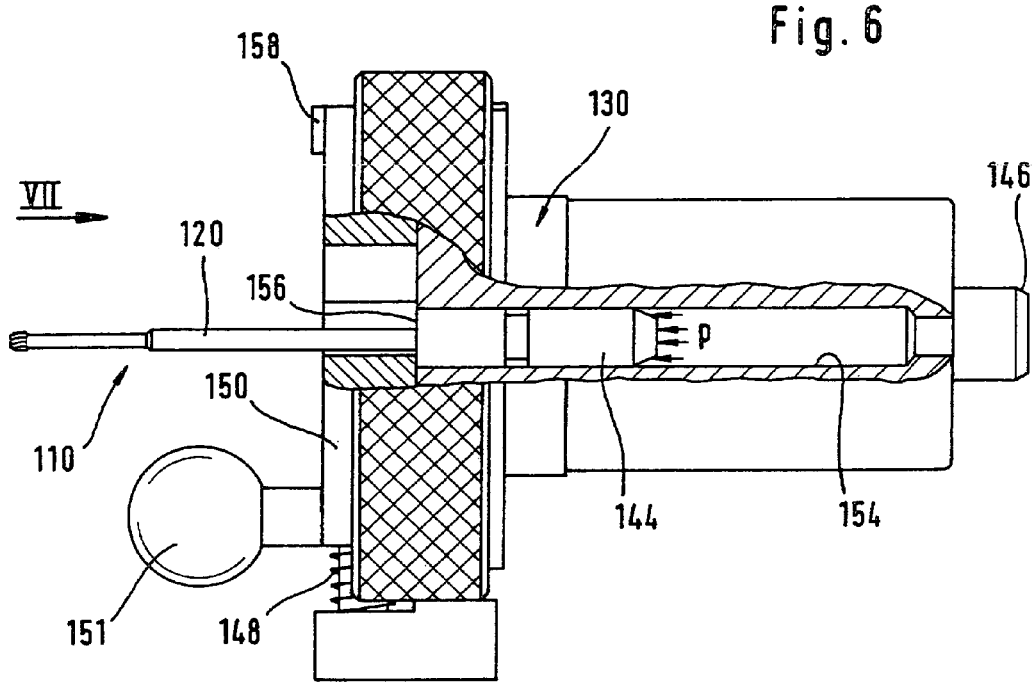
FIG. 6 shows a schematic partial view of a variant of the tool according to FIG. 1, with indicated receiving and fixing in a tool holding fixture.
Figure 7:
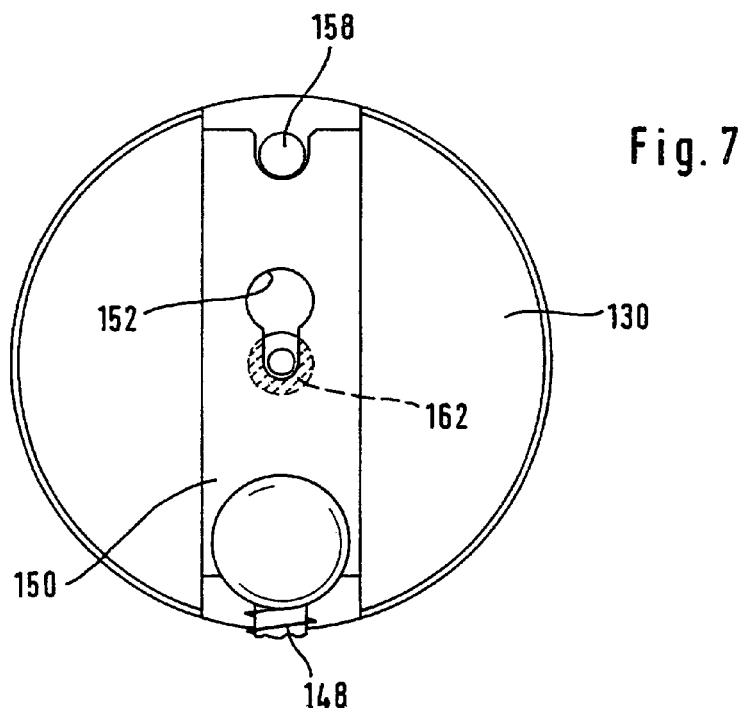
FIG. 7 shows the view "VII" in FIG. 6.

The distinguishing feature of the specific embodiment according to FIGS. 6 and 7 is that the flow medium pressure is used for the rotational and axial positional securing of the tool in fixture 130.

For this purpose, a locking plate 150 is used that can be displaced radially in the end surface of fixture 130 against a spring 148, and in which a keyhole opening 152 is formed. When locking plate 150 is pushed downward against the force of spring 148 in FIG. 7 using actuating button 151, the larger circular bore in the locking plate comes into coincidence with a cylindrical recess 154 in tool holding fixture 130, so that the tool can be introduced into the tool holding fixture from the front. As soon as a shoulder 156 of sleeve 144 moves behind the glide plane of locking plate 150, this plate can slide upward, under the action of spring 148, until it meets a pin 158. The slot-shaped section of keyhole opening 152 here slides along the outer periphery of shaft 120. Sleeve 144 is thus captured behind the locking plate.

If, accordingly (as is indicated by the arrows in FIG. 6), the flow medium pressure is provided against the backside of sleeve 144, the sleeve is pressed against the backside of the locking plate with surface 162, shown in hatched lines. This pressure force is sufficiently large to provide the tool with a securing against rotation, especially since the cutting edges of the tool are not removing large chips.

In FIGS. 4 and 5, another modified tool is shown in which the axial and rotational fixing takes place in the manner of a bayonet socket. Here as well, similar reference characters, to which a "2" have been prefixed, are used for comparable components.

Here as well, shaft 220 has, on the side facing away from cutting head 222 (whose shape is somewhat modified), a fastening and fixing element 244 with which the tool can be fixed in a tool holding fixture so as to be secure against rotation and shifting. This element has an essentially rectangular shape, and works together with an undercut recess (not shown in more detail) in the tool holding fixture, which is constructed in the manner of a bayonet socket.

It has already been mentioned above that the flow medium pressure should be increased into relatively high ranges in order to ensure the sufficient radial deflection of the tool shaft. The pressure-producing device should be able to produce a flow medium pressure in a range from 30 to 3000 bar. For particular designs of the tool shaft and/or the clearance fit between the tool and the fixture, however, pressures of 3 bar can already be sufficient.

Preferably, the relative rotational speed between the tool and the workpiece will be maintained in the range between 100 and 50,000 RPM, the cutting speed being selected in the range between 20 and 3000 m/min.

Figure 9:
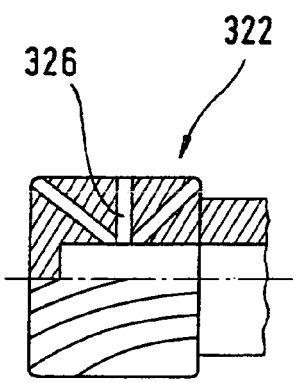
FIGS. 9 and 10 show variants of the design of the cutting head.
Figure 10:
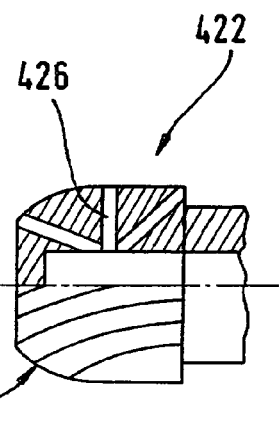

In FIGS. 9 and 10, further variants of cutting head 322 or 422 are shown. In the form according to FIG. 9, the cross-section of the cutting head is almost rectangular, while in the variant according to FIG. 10 a clearer notch 440 can be seen. The orientation of branch channels 326, 426 is also modified in FIGS. 9 and 10.

Cutting head 222 of the variant according to FIG. 4 has the shape of a hemisphere into which the grooves and cutting edges are incorporated.

At least the cutting head of the tool or deburring tool is preferably made from a high-tensile material, such as for example hard metal, rapid steel, such as HSS, HSSE or HSSEBM, ceramic, cermet, or some other sintered metal material. At least in the region of the most highly stressed sections, i.e., in the area of the at least one cutting edge 20*, it can be provided with a coating that is preferably formed as a layer of hard material.

For this hard material layer, for example diamond, preferably nanocrystalline diamond, may be used, as may titanium nitride or titanium aluminum nitride. Particularly suitable layers here include, among others, a titanium aluminum nitride layer and what is known as a multi-ply layer, marketed by the company Gühring oHG under the designation "Fire I." This is a TiN—/(Ti, Al)N multi-ply layer.

Particularly preferably, a layer that protects against wear can also be used that is made up essentially of nitrides with the metal components Cr, Ti, and Al, preferably having a small portion of elements for grain refinement, the Cr portion being 30 to 65%, preferably 30 to 60%, particularly preferably 40 to 60%, the Al portion being 15 to 35%, preferably 17 to 25%, and the Ti portion being 16 to 40%, preferably 16 to 35%, particularly preferably 24 to 35%, with reference to all metal atoms in the overall layer. Here, the layer construction can be single-ply, with a homogenous mixed phase, or it can be made up of a plurality of plys each of which is homogenous in itself, made up in alternating fashion of, on the one hand, $(Ti_xAl_yY_z)N$, with x=0.38 to 0.5 and y=0.48 to 0.6, and z=0 to 0.04, and on the other hand of CrN, the uppermost ply of the wear-protective layer being formed by the CrN layer.

Further specific embodiments are described in FIGS. 11 to 17, in which for these specific embodiments the above-described basic design principles also hold, in particular with respect to tool mounting, material, and coating. For the simplification of the description, in the specific embodiments according to FIGS. 11 to 13 and 14 to 17 similar reference characters, to which a "5" or a "6" has however been prefixed, are used for elements that correspond to components of the specific embodiments previously described.

FIG. 14 shows an essentially cylindrical tool element that is placed in a tool holder (not shown in more detail) and is connected therewith so as to be secure against rotation and shifting, for example by soldering. The tool holder can have any standard form.

According to FIG. 14, there is seated on a cylindrical shaft 520, for example having a diameter of 1.6 mm, a cutting head 522 that has an outer diameter DS of 1.8 mm. The tool is then used to debur a recess or a bore that opens into a bore having an inner diameter of 2 mm.

A centric flow medium channel 524 extends through the entire tool body, and is closed at its end face at 570. Cutting head 522, having an axial length LA of for example 5 mm, is formed as a friction tool, and has a plurality (namely 14) of cutting edges 520* that run in the shape of a helix. At a spacing of for example 3 mm from the tip of the cutting head, two openings 528 of branch channel 526 are present that run in such a way that their axes 527 lie in a common radial plane ER (cf. FIGS. 12 and 13). The diameter of the branch channels is for example 0.3 mm. Central angle WZ, spanned by the planes that contain midaxis 523 of flow medium channel 524 and axes 527 of branch channels 526, is smaller than 180°, and is for example approximately 130°. For the case in which additional branch channels are provided, these are preferably distributed in such a way that central angle WZ between the outermost branch channels is divided by the radial planes running through the axis of the flow medium channel into subangles of equal size, these planes running through the axes of the additional branch channels.

Of course, it is not required that axes 527 of branch channels 526 stand perpendicular to the midaxis of the flow medium channel. For example, in the tool according to FIGS. 11 to 13, it has been determined to be advantageous if axes 527 run at an acute angle, for example 60°, to midaxis 523, in such a way that openings 528 are situated closer to the tip of the tool than are the locations at which branch channel 526 branch off from flow medium channel 524.

Figure 11:
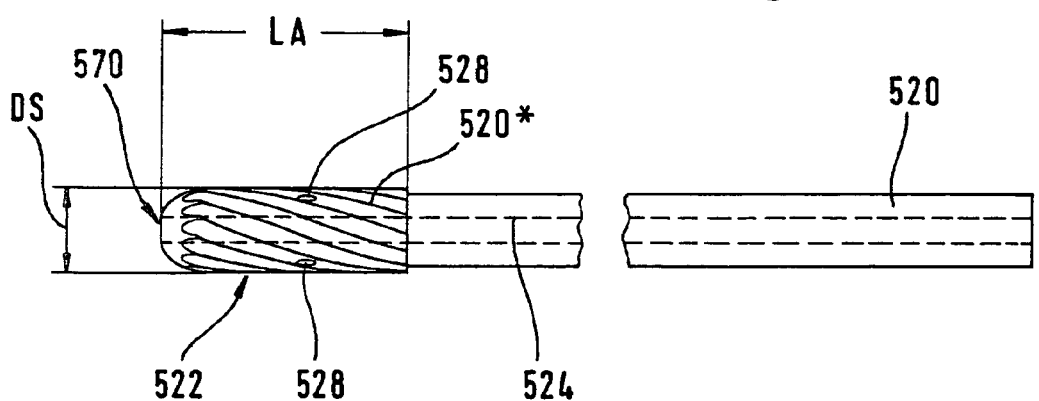
FIG. 11 shows, in a greatly enlarged representation, the schematic side view of a further specific embodiment of the deburring tool.
Figure 15:
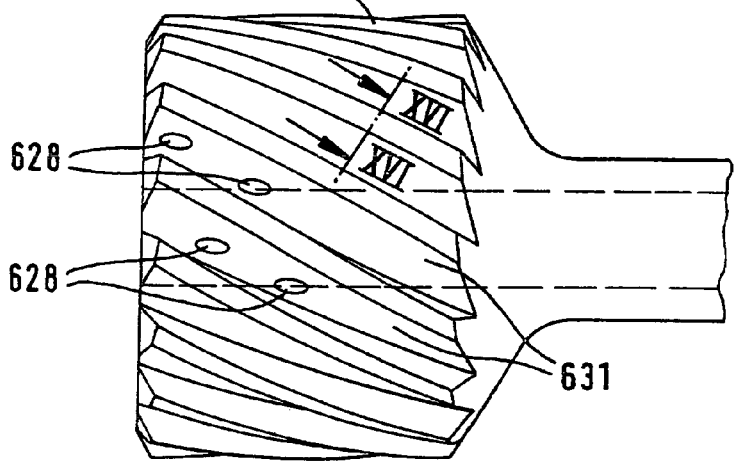
FIG. 15 shows, in an enlarged representation, the cutting head of the tool according to FIG. 14.
Figure 16:
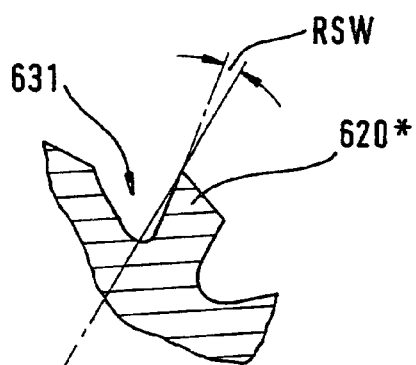
FIG. 16 shows a partly sectional view according to XVI-XVI in FIG. 15.

From the view according to FIGS. 11 to 13, it can be seen that openings 528 are displaced in the peripheral direction to cutting edges 520*, that is, they are situated in a groove bottom between adjacent cutting edges. However, the position of the openings can vary within wide limits.

The tool according to FIGS. 11 to 13 has a cutting edge that is formed in such a way that a negative cutting angle or tool clearance RSW is formed on cutting edge 520*. In this way, cutting edge 520* is given a shaving function, with the result that for the removal of a residual chip on bore 12 to be deburred, it is advantageous to maintain a relatively large radially outward-directed pressure force of the tool against inner surface of recess 14, i.e., to strengthen the flow medium pressure or to make the shaft of the tool softer or more flexible.

In FIGS. 14 to 17, a further variant of a tool according to the present invention is shown. In contrast to the tool according to FIGS. 11 to 13, this deburring tool is designed for bores having a significantly larger inner diameter, for example a diameter of recess 14 of 14 mm. Cutting head 622, which is carried by a cylindrical shaft 620 and is for example integrally formed in one piece therewith, has in this case an outer diameter DS of 13.75 mm, so that in this case as well a radial play of a maximum of approximately 0.25 mm remains when the tool is introduced into recess 14. The diameter of shaft 620 is for example only approximately 5 mm. The shaft is thus significantly tapered in relation to cutting head 622. 619 designates a segment via which shaft 620 can be fastened to a tool holding fixture (not shown).

Cutting head 622 has 16 cutting edges 620\* that run in the shape of a helix, between which there are the same number of flutes 631. Cutting edge foot diameter FDS is for example approximately 12 mm.

Figure 17:
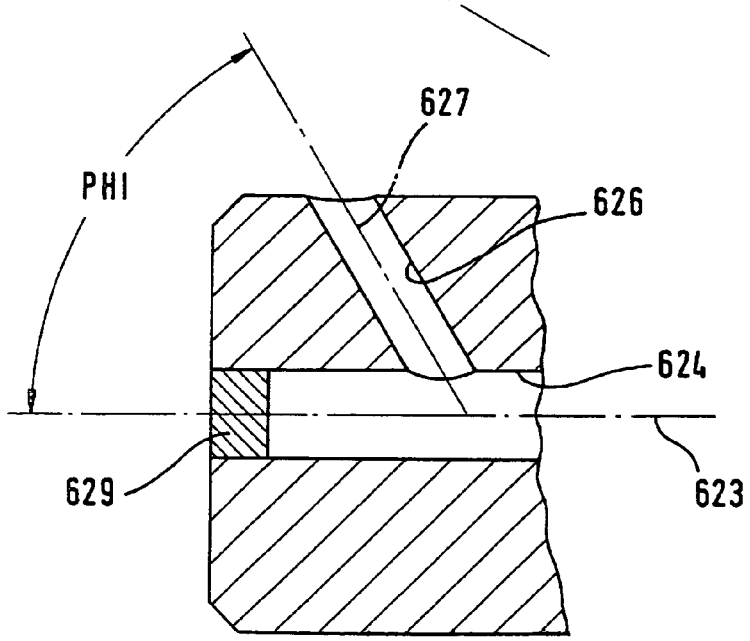
FIG. 17 shows a schematic sectional view of the cutting head according to FIG. 15, for the illustration of the position of the branch channels provided therein.

As can be seen from FIGS. 14 and 17, a centric flow medium channel 624 is in turn provided that is closed at its end face in the area of cutting head 622 by an element 629 that is for example soldered in.

From flow medium channel 624 there extend (as can best be seen in FIG. 15) four branch channels whose openings 628 are situated in the area of groove walls 631. The diameter of the branch channels is for example approximately 0.8 mm. In the depicted exemplary embodiment, the branch channels open pair-by-pair into two adjacent grooves, in such a way that the openings of a groove are situated on a helix running parallel to the groove. However, as results from the above description, it is not required to concentrate the openings in such a narrow fashion. They can likewise be distributed over a much larger central angle, it being necessary only to fulfill the criteria of claim 2.

As results from FIG. 17, branch channels 626 are inclined with their axes 627 at an acute angle PHI to midaxis 623 of flow medium channel 624. This angle is for example approximately 60° for each branch channel.

A further particular feature of the specific embodiment according to FIGS. 14 to 17 is that cutting edges 620\* are specially formed, in such a way that (as can be seen in detail in FIG. 16) a positive cutting angle or tool clearance RSW arises at cutting edge 620\*. In the exemplary embodiment, this is for example 3E. In this way, cutting edge 620\* comes to a sharp edge that makes it possible to remove the residual chip not by shaving but rather by cutting. The pressure of the cutting head, directed radially outward onto the inner wall of recess 14, can thus be kept smaller with this tool.

The manner of operation of the tools according to FIGS. 11 to 17 corresponds in principle to those of the other described specific embodiments. However, here it should be emphasized that a variation of the possibilities of use of the described tools is that, through targeted positioning of midaxis 523 or 623 of the tool to the center of recess 14 into which the tool is introduced, the deburring process can be optimized. If midaxis 523, 623 is brought precisely into alignment with the center of the recess, the cutting head will carry out a uniform processing of the inner surface of the recess. Through well-directed off-center guiding of the cutting head, preferably in such a way that the radial off-center position is matched to the position of the opening location 16 that is to be deburred, the cutting head, when it is brought into the recess, is forced to execute a movement upon being charged with pressure from the flow medium that results in a strengthening of the contact pressure of the at least one cutting edge in the area of opening location 16 to be deburred, reducing the contact pressure in the other areas of the inner surface of recess 14. In this way, the deburring function can be made more efficient in a well-directed fashion, in particular if there is only one opening location 16 that is to be deburred, or a plurality of opening locations are situated with a relatively close angular distance to one another.

In the above, specific embodiments have been described in which the hydrostatic dynamic pressure of a flow medium supplied in the interior of the tool is used to provide a radial force-producing device integrated into the tool, with which the cutting head, whose diameter is chosen such that it can be introduced either into the recess or into the bore with radial play, can be deflected radially in its rotational movement, preferably in controlled fashion. This variant presumes that the exit of the flow medium takes place in the area of an inner wall, in such a way that the inner wall is situated opposite the opening. In other words, the cutting head of the specific embodiments according to FIGS. 1 to 17 can be deflected sufficiently far only as long as at least one exit opening 28 still comes to be situated inside recess 14.

Figure 18:
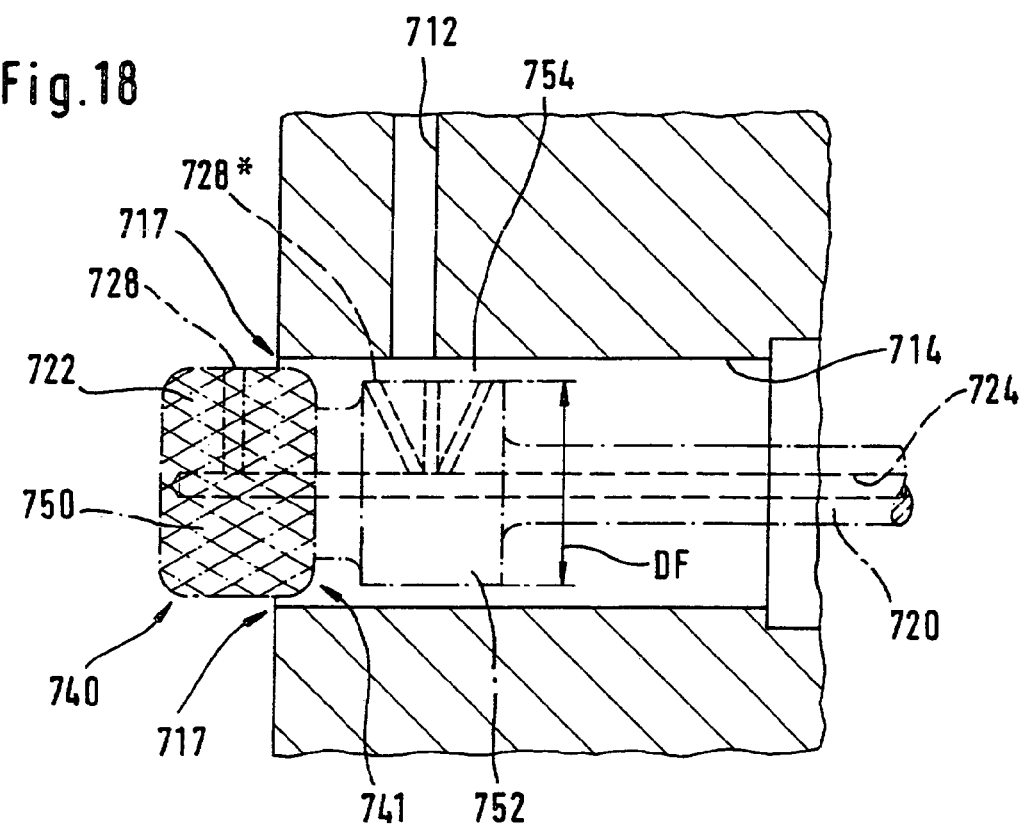
FIG. 18 shows, in a representation similar to FIG. 8, a schematic view of a further specific embodiment of the present invention.

The development of FIG. 18 is used to enable the use of the overall axial length of the cutting head, and even the area of a transition to the shaft, for a deburring process.

In this development, in particular the deburring of locations 717 of bore 714 is simplified, in that a backwards notch or rounding transition 741 of cutting head 722 is used. Cutting head 722 itself can be fashioned with respect to its geometry, material, and properties in the same way as described above, or as described in the claims, so that these are not described in more detail here. As is schematically indicated, the cutting edges provided for the deburring can be formed by what is known as a BIAX ribbing or fluting 750. However, other geometries of the cutting edges are equally possible.

In order for it to be possible to produce a hydrostatic deflecting force even when cutting head 722 has largely exited from bore 714, shaft 720 has, at an axial distance from the cutting head, a guide and support element 752 having a diameter DF that is matched to the inner diameter of bore 714 in such a way that a functional gap 754 is formed having a predetermined width. This functional gap can vary over the periphery; what is decisive is the measure in the area of openings 728\*. From the representation of FIG. 18, it can be seen that via openings 728\*, the required dynamic pressure can be built up even if cutting head 722, in which, as before, a radial channel system 728 (indicated with a double-dash-dotted line) can also be formed, has exited bore 714. In the position shown in FIG. 18, rounding section 741 can also effectively be used for the deburring of area 717 when interior channel 724 is charged with fluid pressure; here it can be advantageous to subject the tool to a slight axial tension at this moment.

Figure 19:
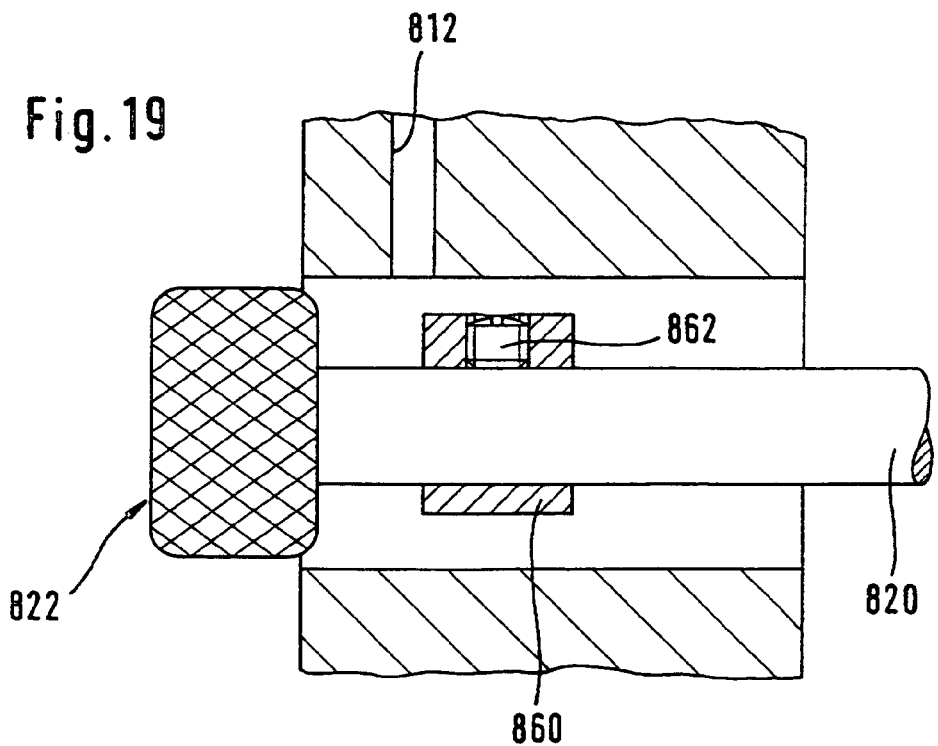
FIG. 19 shows a representation, similar to FIG. 18, of a further specific embodiment of the present invention.

The above-described variants integrate the radial force-producing device into the tool in the form of an interior pressure fluid channel system. An alternative is shown in FIG. 19.

Here, the controlled radial deflection of the cutting head is produced by a dynamic force, namely by the centrifugal force of an imbalance mass. Cutting head 822 can in turn can be formed as explained in one of the previously described variants, for example as shown in FIG. 18. Instead of an interior channel system, shaft 820 has an eccentric ring 860 that preferably sits on shaft 820 axially and so as to be able to be displaced in the direction of rotation, and for example can be clamped fast there by means of a stud screw 162. The axial displacement makes it possible to control the magnitude of the dynamic radial force, and in particular to adapt it to the stability of the shaft. In order to avoid wearing of the cutting edges of cutting head 822 on one side, it is advantageous to rotate imbalance mass 860 at regular time intervals.

Of course, instead of a separate imbalance element it is also possible to use other measures in order to produce the imbalance forces. The imbalance can for example be integrated into the tool in one piece by attaching an asymmetrical polished section.

On the basis of FIGS. 20 to 22, an exemplary embodiment of the present invention is explained with which it is possible to effectively debur extremely small bores that are accessible only with difficulty. For the simplification of the description, in this specific embodiment as well those components that correspond to the components of the previously described variants are provided with similar reference characters to which a "9" has been prefixed. The bore 914 that is to be deburred is a bore having for example 0.7 mm diameter and a length L of for example 6 to 7 mm; this bore is connected to a deep-hole bore 970 that likewise has a small diameter DT of for example up to 4 mm, and a depth TT of for example 80 mm. In FIG. 21, the constellation in the area of bore 914 is shown in the scale M 10:1.

A dotted line indicates the area of the tip of deburring tool 910, whose cutting head 922 is introduced far enough into bore 914 that exit edge 972 can be deburred.

Tool 910 is shown true to scale in FIG. 22, in a scale M of approximately 5:1.

To a clamping segment 944 there is connected a shaft 920 whose length LS corresponds at least to measure TT of bore 970, and whose diameter DS is selected such that shaft 920 can be accommodated in bore 970 with a predetermined radial play SR. The positional allocation between bore 970 and tool 910 introduced into the bore for the deburring process is indicated in FIG. 22 by a dotted-line representation of bore 970.

Shaft 920 has in turn an inner bore 924 via which pressure medium can be supplied from clamping segment 944. Reference character 926 designates a radial channel whose opening is situated opposite the inner wall of bore 970, at a predetermined distance.

Shaft 920 carries, on the side facing away from element 944, what is known as a deburring lance 974, which carries on the end of a pin 976 the actual cutting head 922. Diameter D922 of the cutting head is slightly smaller than diameter D914 of bore 914. As can further be seen in FIG. 22, deburring lance 974 is fastened in detachable fashion on tool shaft 920, for example being screwed on, in such a fashion that interior bore 924 is closed.

From the description of the tool, it can be seen that when interior bore 924 is charged with pressure, through the uneven peripheral distribution of radial bores 926 a radial deflection of shaft 920, and thus of cutting head 922, can be caused, through which the deburring process can be carried out. As at location 972, area 978 of bore 914 can also be deburred.

The construction of the tool according to FIG. 22 makes it possible to use different materials for segments 944, for shaft 920, and for the actual deburring lance 974 with cutting head 922. Because shaft 920 has a very large axial length in relation to its diameter DS, it has proven advantageous to manufacture this shaft from a high-tensile material, whose elasticity is chosen such that the radial deflections that occur during deburring lie exclusively within the elastic range of deformation of the material. Suitable materials include hard materials, such as for example hard metals or cermets, but also compound materials, such as for example carbon fiber-plastic compound materials.

Of course, the shape of cutting head 922 is not limited to the depicted geometry. Rather, all standard geometries can be used, and the formation of the cutting edges can also be varied within wide limits. The length L976 of pin 976 is selected according to the axial length of bore 914.

With respect to the construction of radial bore 926, there is again a large amount of room for variation in the design with respect to size, position, and number, as has also been described for the previously specified exemplary embodiments.

Of course, the tool according to FIG. 22 can also be brought to execute the movements required for the deburring process by an imbalance integrated into the tool, as described in connection with FIGS. 18 and 19.

Of course, deviations from the described specific embodiments are possible without abandoning the basic idea of the present invention.

Thus, for example a plurality of internally situated flow medium channels can be provided.

If the tool is used for deburring a plurality of bores staggered in the axial direction, it is advantageous to carry out the supply of flow medium to the tool with an elevated pressure only when the cutting head has moved into the vicinity of the bore opening to be deburred.

With respect to the geometry of the cutting head as well, the present invention is not to be considered as limited to the depicted specific embodiments. Examples of standard and useful constructions of the cutting head include the cylinder shape, flame shape, spherical shape, sphero-cylindrical shape, or give or arch shape, pointed cone shape, semicircular arch shape, disk shape, and teardrop shape, as used for example also for hard metal milling pins, e.g. of the firm August Rüggeberg GmbH & Co. KG, PFERD-Werkzeuge, 51709 Marienheide.

It should also be emphasized that the present invention is also seen solely in the idea of using the flow medium standing under relatively high pressure for deburring, be it through the "water cutting effect," i.e., the building up of a cutting jet alone, or through the dynamic pressure force caused by the radially exiting flow medium current, causing a radial deflection of the tool shaft and thus of the cutting head.

The present invention thus creates a preferably rotationally driven tool for deburring openings, such as for example bores, that open laterally into an essentially cylindrical recess. The tool has a cutting head seated on a shaft, having at least one cutting edge that extends, at least in sections, in the axial direction. So that the deburring can be carried out reliably and with the lowest possible expense, a radial force-producing device is integrated into the tool, for example in the form of at least one internally situated flow medium channel, from which at least one branch channel goes out that opens in the area of the cutting head or in the vicinity thereof, preferably at a peripheral distance to the at least one cutting edge, in the outer peripheral surface thereof. Because the diameter of the cutting head is selected such that it can be introduced into the recess with radial play, the radial force produced either upon the rotation of the tool or through the feeding in of flow medium under pressure has the effect that the cutting head is deflected radially in elastic fashion, through which the inner surface of the recess is gently processed, and the deburring process can thereby be reliably executed.

The invention claimed is:

1. A rotationally drivable tool for deburring a bore, comprising,
a cutting head seated on a shaft, the cutting head having at least one cutting edge that extends, at least in sections, in the axial direction and that executes a cutting process on the basis of a relative movement between the tool and a workpiece; and a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, wherein the radial force-producing device integrated into the tool has at least one internally situated flow medium channel from which at least one corresponding branch channel having at least one opening that communicates with an external peripheral surface of the tool, either in the area of the cutting head or in a vicinity, axial thereto, and at a peripheral distance to the at least one cutting edge.

2. The tool as recited in claim 1, wherein a plurality of branch channels are provided with a corresponding number of openings that are distributed over the peripheral surface in nonuniform fashion in such a way that the sum of the dynamic pressure forces produced in the area of the openings between the cutting head and the inner wall of the recess deflects the shaft in the radial direction.

3. The tool as recited in claim 1, wherein a plurality of branch channels are provided whose openings are staggered in the axial direction.

4. The tool as recited in claim 1, wherein the at least one branch channel has a diameter in the range from 0.1 to 5 mm.

5. The tool as recited in claim 1, wherein a plurality of internally situated flow medium channels are provided.

6. The tool as recited in claim 1, wherein the at least one opening is situated in the area of the cutting edge.

7. The tool as recited in claim 1, wherein at least one of the openings is situated in the area of a groove bottom between two adjacent cutting edges.

8. The tool as recited in claim 1, wherein the at least one branch channel is formed in rectilinear fashion.

9. The tool as recited in claim 8, wherein the at least one branch channel is formed by a bore.

10. The tool as recited in claim 8, wherein the at least one branch channel is formed by a recess.

11. The tool as recited in claim 8, wherein an angle of the branch channel to the axis of the tool is in the range from 50° to 175.

12. The tool as recited in claim 1, wherein the shaft on the side facing away from the cutting head, carries an element via which a flow medium can be fed into the at least one flow medium channel.

13. The tool as recited in claim 12, wherein the element for feeding in the flow medium simultaneously forms a fastening and fixing element with which the tool can be fixed in a tool holding fixture so as to be secured against rotation and shifting.

14. The tool as recited in claim 1, wherein the at least one opening is situated along the external peripheral surface of the tool and comprises a central angle between 120° to 140°.

15. The tool as recited in claim 14, wherein a multiplicity of openings are situated so as to be uniformly offset to one another in the peripheral direction.

16. The tool as recited in claim 1, wherein the openings are situated on at least one essentially helical line.

17. A rotationally drivable tool for deburring a bore, comprising, a cutting head seated on a shaft, the cutting head having at least one cutting edge that extends, at least in sections, in the axial direction and that executes a cutting process on the basis of a relative movement between the tool and a workpiece; and a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, wherein a multiplicity of cutting edges distributed over a peripheral surface of the tool.

18. A rotationally drivable tool for deburring a bore, comprising, a cutting head seated on a shaft, the cutting head having at least one cutting edge that extends, at least in sections, in the axial direction and that executes a cutting process on the basis of a relative movement between the tool and a workpiece; and a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, wherein the shaft is tapered in relation to a diameter of the cutting head.

19. A rotationally drivable tool for deburring a bore, comprising, a cutting head seated on a shaft, the cutting head having at least one cutting edge that extends, at least in sections, in the axial direction and that executes a cutting process on the basis of a relative movement between the tool and a workpiece; and a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, wherein the cutting head has, at least on its side facing away from the shaft, a notch that is formed by one of a chamfer and a rounded section.

20. A rotationally drivable tool for deburring a bore, comprising, a cutting head seated on a shaft, the cutting head having at least one cutting edge that extends, at least in sections, in the axial direction and that executes a cutting process on the basis of a relative movement between the tool and a workpiece; and a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, wherein the at least one cutting head is manufactured from a high-tensile material, wherein the high-tensile material is one of a group including a wear-resistant steel, rapid high speed steel, hard metal, ceramic, cermet, and a sintered metal material.

21. A rotationally drivable tool for deburring a bore, comprising, a cutting head seated on a shaft, the cutting head having at least one cutting edge that extends, at least in sections, in the axial direction and that executes a cutting process on the basis of a relative movement between the tool and a workpiece; and a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, wherein the at least one cutting edge has an essentially helical shape.

22. A rotationally drivable tool for deburring a bore, comprising,
a cutting head seated on a shaft, the cutting head having at least one cutting edge that extends, at least in sections, in the axial direction and that executes a cutting process on the basis of a relative movement between the tool and a workpiece; and
a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device,
wherein at least the shaft is made of a high-tensile material comprised of one of a group including a hard material, a hard metal, a cermet material, and a compound material including a carbon-fiber plastic material, and the shaft has an elasticity such that the radial deflections of the cutting head that occur during a deburring process fall within the range of the elastic deformation.

23. A rotationally drivable tool for deburring a bore, comprising,
a cutting head seated on a shaft, the cutting head having at least one cutting edge that extends, at least in sections, in the axial direction and that executes a cutting process on the basis of a relative movement between the tool and a workpiece; and
a radial force-producing device that is integrated into the tool, wherein a diameter of the cutting head is selected such that it can be introduced either into a substantially cylindrical recess or into the bore with radial play, and the shaft can be deflected radially during its rotational movement in controlled fashion by the radial force producing device, and wherein a coating is applied to the tool.

24. The tool as recited in claim 23, wherein the construction of the coating is made up of a homogenous mix phase.

25. The tool as recited in claim 23, wherein the construction of the coating is made up of a plurality of individual plys that are homogenous in themselves, made up in alternating fashion of, $(Ti_xAl_yY_z)N$, with x=0.38 to 0.5 and y=0.48 to 0.6, and z=0 to 0.04, and CrN.

26. An apparatus for deburring bores that open laterally into an essentially cylindrical recess, by means of a tool as recited in claim 1, wherein the apparatus has a rotational drive device and a flow medium source for feeding flow medium under pressure into the at least one flow medium channel.

27. The apparatus as recited in claim 26, wherein the flow medium is formed by one of a liquid and a gaseous cooling agent and lubricant.

28. The apparatus as recited in claim 26, wherein a pressure-producing device is provided with which a flow medium pressure in a range from 3 to 3000 bar is produced.

29. The apparatus as recited in claim 26, wherein a tool holding fixture in which a fastening and fixing element is accommodated in the manner of a bayonet socket.

30. An apparatus for deburring bores that open laterally into an essentially cylindrical recess as recited in claim 26, that carries on a side facing away from a cutting head a cylindrical prismatic element for feeding in flow medium under pressure, wherein the flow medium pressure is used for the axially stable and rotationally secure fixing of the tool in a tool holding fixture.

31. The apparatus as recited in claim 30, wherein the tool holding fixture is equipped with a cylindrical receiving bore for the element for feeding in the flow medium, and with a radially adjustable locking element formed with a keyhole opening, against which locking element a shoulder of the fastening and fixing element can be pressed when the flow medium pressure is fed into the fastening and fixing element.

32. A method for deburring bores that open laterally into an essentially cylindrical recess by means of an apparatus according to claim 26, wherein the pressure of the flow medium that is passed through the tool and introduced into the recess is used to deflect the cutting head radially, wherein the at least one cutting edge comes into engagement with a chip to be removed.

33. The method as recited in claim 32, wherein a flow medium pressure is increased to a high level such that the flow medium exiting from the at least one opening forms a cutting jet with which a machining processing can be effected.

34. The method as recited in claim 32, wherein:
a) introducing the tool into the recess so as to undergo a relative rotational movement with respect to a workpiece, and
b) passing a pressurized stream of the flow medium through the tool, so as to cause radial deflection of the cutting head.

35. The method as recited in claim 34, wherein during method step b) at least one of the tool and workpiece executes an advance motion.

36. The method as recited in claim 32, wherein at least one of the tool and the workpiece is driven with a rotational speed in the range between 100 and 50,000 RPM.

37. The method as recited in claim 32, wherein the cutting speed is selected in the range between 20 and 300 m/min.

38. The tool as recited in claim 11, wherein an angle of the branch channel to the axis of the tool is in the range from 40° and 60°.

39. The tool as recited in claim 23, wherein the coating is a hard material layer comprising one of a group including diamond, non-crystalline diamond, TiN, (Ti, Al)N, a multiply layer and a layer including nitrides.

40. The tool as recited in claim 39, wherein the layer including nitrides comprises at least one of Cr, Ti and Al.

41. The tool as recited in claim 40, wherein the layer including nitrides further includes elements for grain refinement.

42. The tool as recited in claim 41, wherein in the layer made up of nitrides, having the metal components Cr, Ti and Al, and having a low portion of elements for grain refinement, the Cr portion is about 30 to 65%, the Al portion is about 15 to 35%, and the Ti portion is about 16 to 40%, with reference to all metal atoms in the overall layer.

43. The tool as recited in claim 42, wherein in the layer made up of nitrides, having the metal components Cr, Ti and Al, and having a low portion of elements for grain refinement, the Cr portion is about 30 to 60%, the Al portion is about 17 to 25%, and the Ti portion is about 24 to 35%, with reference to all metal atoms in the overall layer.

44. The tool as recited in claim 25, wherein the uppermost ply of the coating is CrN.

* * * * *